United States Patent
Eberly, Jr.

[15] 3,681,991
[45] Aug. 8, 1972

[54] ELECTRONIC THERMOMETER

[72] Inventor: David H. Eberly, Jr., Fairfield, Conn.

[73] Assignee: United States Banknote Corporation, New York, N.Y.

[22] Filed: July 6, 1970

[21] Appl. No.: 52,667

[52] U.S. Cl.............................................73/362 AR
[51] Int. Cl.................................................G01k 7/24
[58] Field of Search..................................73/362 AR

[56] References Cited

UNITED STATES PATENTS

| | | | |
|---|---|---|---|
| 3,540,283 | 11/1970 | Dean | 73/362 AR |
| 3,550,448 | 12/1970 | Ensign | 73/362 AR X |
| 3,025,706 | 3/1962 | Oppenheim | 73/362 AR |
| 3,367,186 | 2/1968 | Ensign et al. | 73/362 AR |
| 3,217,544 | 11/1965 | McElvenny | 73/362 AR |
| 3,254,533 | 6/1966 | Tongret | 73/362 AR |
| 2,677,965 | 5/1954 | Saffir | 73/372 |

Primary Examiner—Louis R. Prince
Assistant Examiner—Frederick Shoon
Attorney—Cushman, Darby & Cushman

[57] ABSTRACT

An electronic thermometer having a casing, a probe removably mounted in a probe well in the casing, a thermistor mounted in the top of the probe, a resistance bridge with the thermistor connected as one of the bridge resistances so that the bridge output indicates the temperature of the thermistor, a meter responsive to the bridge output for displaying the temperature of the thermistor, and at least one, and preferably two wells in the casing for each holding a plurality of disposable probe covers in each well, the covers in one well preferably being of a different color from the covers in the other well. In one embodiment, a first resistor is mounted in the casing adjacent the probe well for heating the thermistor so that the temperature at that location can be quickly determined and a second resistor is mounted adjacent the probe cover wells for heating the probe covers in these wells. In another embodiment two probes are provided, one for taking human temperature orally and the other for taking human temperatures rectally.

15 Claims, 10 Drawing Figures

PATENTED AUG 8 1972

INVENTOR
DAVID H. EBERLY, JR.

BY Cushman, Darby & Cushman
ATTORNEYS

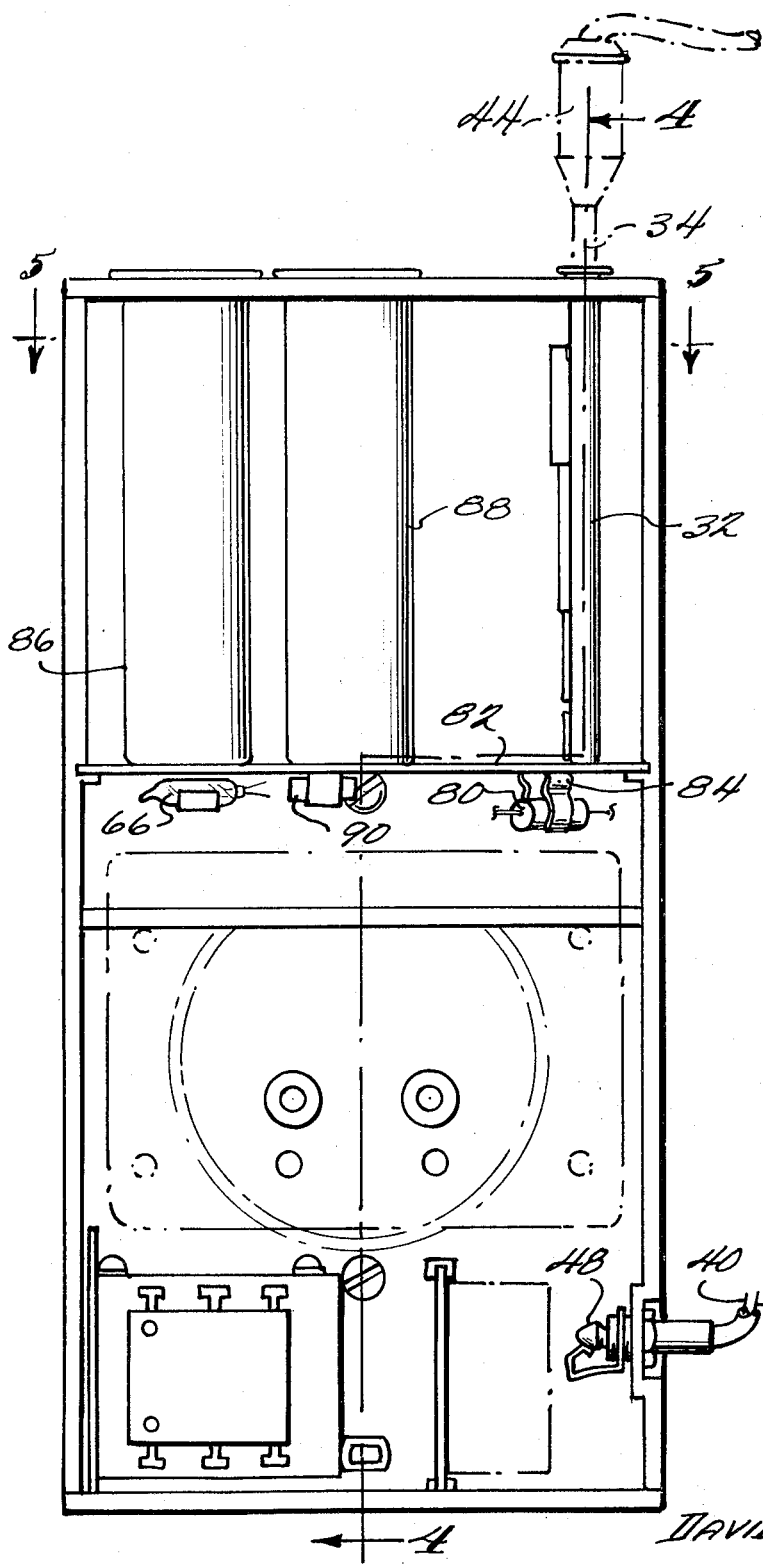

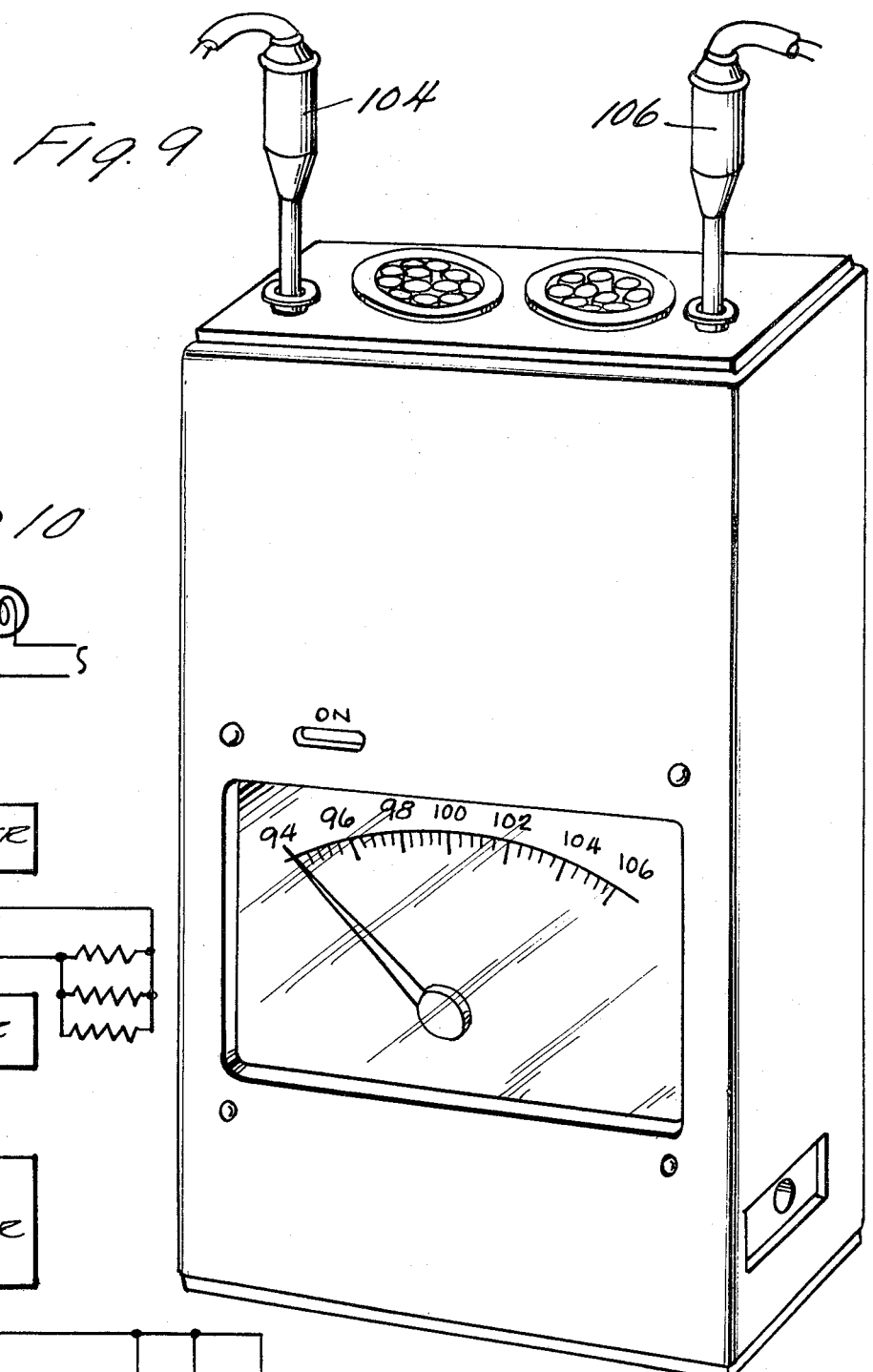

ELECTRONIC THERMOMETER

BRIEF DESCRIPTION OF THE PRIOR ART AND SUMMARY OF THE INVENTION

The invention relates to an electronic thermometer, and more particularly to an electronic thermometer of the type having a casing and a probe removably mounted in the casing for transfer to the location whose temperature is to be ascertained.

Many materials have a physical characteristic which varies with temperature. Accordingly, the temperature of the material, and more importantly, the approximate temperature at the location of the material can be determined by determining the value of that varying characteristic. One such physical characteristic which is particularly easy to determine is electrical resistance and electronic thermometers, particularly for taking the temperature of human patients, have become increasingly popular, particularly in hospitals where many temperatures must be taken frequently. Since, in such thermometers, an electrical signal which is a function of temperature is produced, the temperature can be easily displayed on a device such as a meter or nixie tube which is much easier to read and much more accurate than the scale on a conventional mercury thermometer, or can be transmitted to central or other facility for monitoring or recording.

One type of electronic thermometer which has been found to be particularly satisfactory includes a casing, a probe well in that casing, a probe having a thermistor mounted in its tip and adapted to be disposed in the well when a temperature is not being taken, means, such as a resistance bridge, for producing an electrical signal which is a function of the resistance of the thermistor and hence the temperature of the thermistor and means for suitably displaying the temperature of the thermistor as derived from the bridge. One problem which has been associated with this type of thermometer is the considerable time required for the thermistor temperature to reach the temperature of its location after it has been removed from the well and transferred to the temperature taking site. This problem is particularly acute in taking temperatures of patients in hospital or similar institutions because of the considerable time wasted in simply waiting for the displayed temperature to stabilize at the true value. A further problem is patient discomfort stemming from rectal or oral insertion of a probe whose temperature differs markedly from the temperature of the body.

In the embodiment of the novel invention of this application as described below, the thermistor is heated in the probe well to a temperature near the temperature at the location to which the probe is to be transferred so that the time required for the thermistor to reach the temperature at that location is minimized. Preferably, when the temperature at the location is above the temperature through which the probe travels from the well to that location, such as when the temperature of a patient in a hospital or other institution is to be taken, the probe in the well is heated sufficiently above the approximate temperature at the location so that the thermistor arrives at the location at roughly its temperature. When human temperatures are being taken either rectally or orally, the thermistor is preferably heated in the well to a temperature of roughly 105°–110° F. so that with an 8 to 12 second travel time from well to patient, the probe is inserted into the patient at roughly body temperature.

Further, one particularly effective arrangement for heating the thermistor is a resistor of an appropriate value disposed adjacent the probe while the probe is in the probe well. An appropriate source of electrical current is connected to the resistor for resistively heating it.

One problem associated with the use of electronic thermometers, particularly those which are used orally or rectally for taking human temperatures, is the necessity to prevent transmission of disease bearing organisms from one patient to the next via the probe. One solution to this problem is to use disposable probe covers which can be easily slipped over the probe before its insertion and thrown away after use so that the probe itself is never contaminated. One probe cover which has been found particularly effective is an elongated straw-like tube which is open at one end for receiving the probe, and which has a metal tip at the other end which fits adjacently the thermistor and readily conducts heat to the thermister to help minimize the time required for the thermistor to stabilize at the true temperature. Probe covers of this nature are described in Saffir U.S. Pat. No. 2,677,965, and the disclosure of this patent is hereby explicitly incorporated herein by reference.

In the embodiment of the invention described below, two probe cover wells are provided adjacent the probe well, each probe well being adapted to hold a number of probe covers so that after the probe is manually removed from its well, one of the probe covers can be easily speared by the probe without being touched. One of the wells holds probes for oral insertion and the other for rectal. The two types of covers are preferably visually differentiable, for example, by color. In addition, the probe cover wells may contain talc and/or a germicide.

According to one feature of this invention, the probe covers in the wells are heated, like the probe itself, to a temperature in the range of the temperature at the location where the temperature is to be measured. Preferably, this heating is accomplished by the passage of current through a resistor mounted adjacent the probe cover wells. This prevents a rapid cooling of the probe upon placement of a cover on the probe and also helps in keeping the probe temperature near the desired value when the probe is being used continuously without reinsertion in the probe well after each use.

According to another aspect of the invention, a switch is provided in the probe well so that current is supplied to the bridge of which the thermistor is a part only when the probe is removed from its well. Besides minimizing power losses and wear, this provision results in a readily visible jump of the needle on the meter or the readout of another display device to the pre-heated probe temperature. This indicates readily to the person taking the temperature that the device is acting properly and is as alive and as anxious to take the temperature as he or she is.

As mentioned above, the thermistor is preferably connected as one of the resistors in a resistive bridge which then produces a signal which varies as a function of the temperature of the thermistor. According to another aspect of this invention, the values of the other bridge resistances are chosen so that, when the thermistor is removed from the bridge by disconnecting the wire linking it to the bridge, the display device will read a given temperature. For taking human temperature, this temperature is preferably the easily remembered, normal body temperature of 98.6° F. Accordingly, to check the calibration of the thermometer, it is only necessary to disconnect the thermistor from the bridge and read the displayed value.

While it may be sanitary to insert the probe, covered by a disposable cover, into one patient rectally and then to insert the same probe, although covered by a different cover, into the next patient orally, it may be psychologically unsatisfactory to do so. Accordingly, according to a further embodiment of the invention, as discussed below, two probes each with their own well can be provided. One of the probes is used rectally and the other orally, and each may be colored differently if desired.

Many other objects and purposes of the invention will become clear from the following detailed description of the invention.

BRIEF DESCRIPTION OF THE DRAWINGS

FIG. 3 shows a front view of the thermometer with the front of the casing removed.

FIG. 6 shows the probe switch.

FIG. 9 shows a further embodiment of the invention with two probes.

FIG. 10 shows a schematic view of a bridge for use in the embodiment of FIG. 9.

DETAILED DESCRIPTION OF THE DRAWINGS

Figure 1:
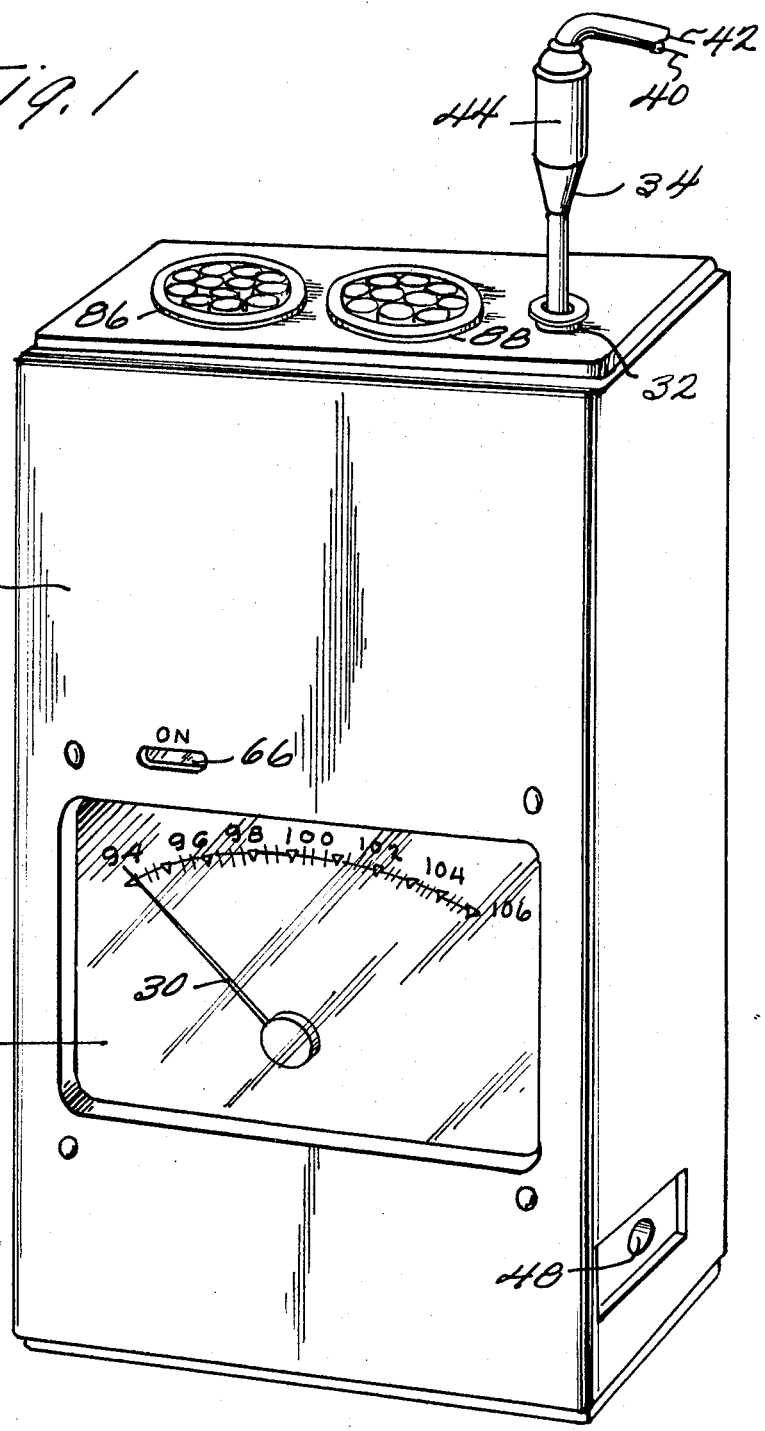
FIG. 1 shows a perspective view of the novel thermometer of this invention.

Reference is now made to FIG. 1 which shows a perspective view of the novel thermometer of this invention. A suitable and attractive casing 26 is provided with a transparent window 28 through which the position of needle 30, and hence the temperature of the location whose temperature is being monitored, can be easily noted. As shown, the meter of which needle 30 is a part and which is preferably a conventional D.C. meter is calibrated on a scale between 94 and 106° F., a range suitable for taking human temperatures. It will be understood, of course, that by proper choice of the bridge resistances or other elements which produce the signal which is applied to the meter, any temperature range can be monitored and, accordingly, the thermometer can be employed for taking temperatures of many things other than human beings.

Figure 4:
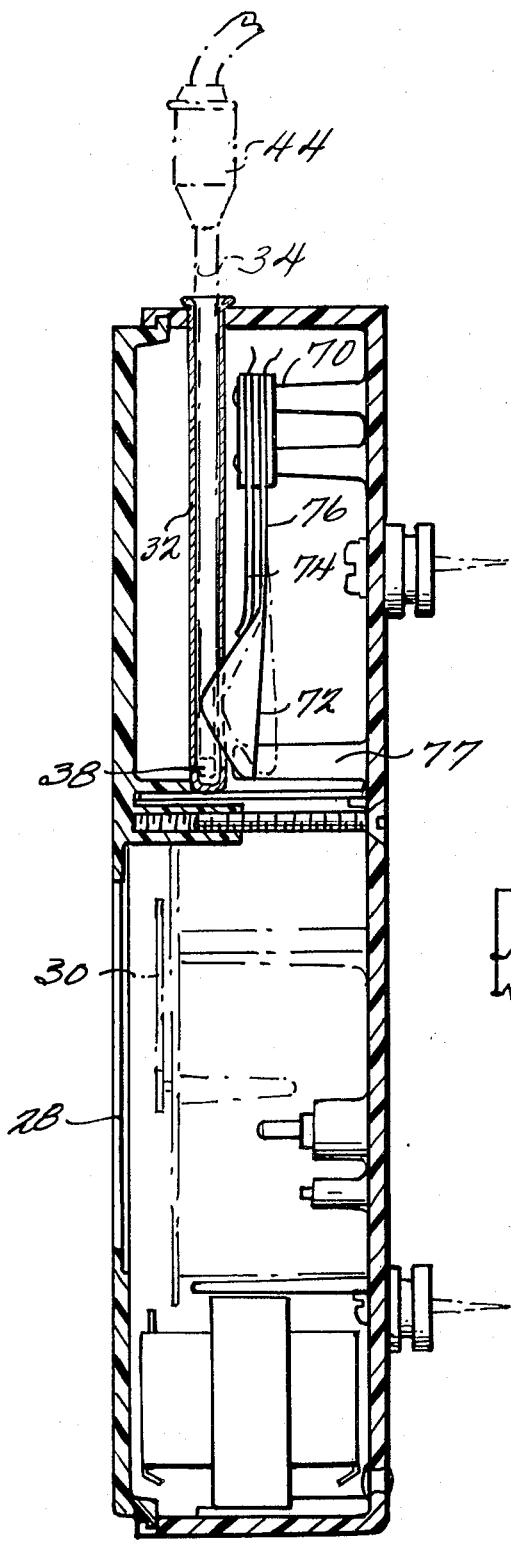
FIG. 4 shows a cut-away view of FIG. 3 along the line 4—4.

As mentioned briefly above, the novel thermometer of this invention is provided with a well 32 which can be seen best in FIGS. 3 and 4. Well 32 has a diameter and depth suitable for receiving the elongated probe 34 and well 32 holds probe 34 when the thermometer is not in use. The well may be constructed of any suitable material but, as will be apparent from the discussion below, it is desirable that it have relatively good heat conducting characteristics.

A conventional thermistor 38 or other element whose resistance varies with temperature is mounted in the tip of probe 34 as shown in FIG. 4. When probe 34 is inserted orally or rectally into a human or otherwise transferred to a location whose temperature is to be determined, thermistor 38, after a short interval, reaches the temperature of its surroundings and that temperature can be ascertained by simply determining the resistance of thermistor 38.

Figure 8:
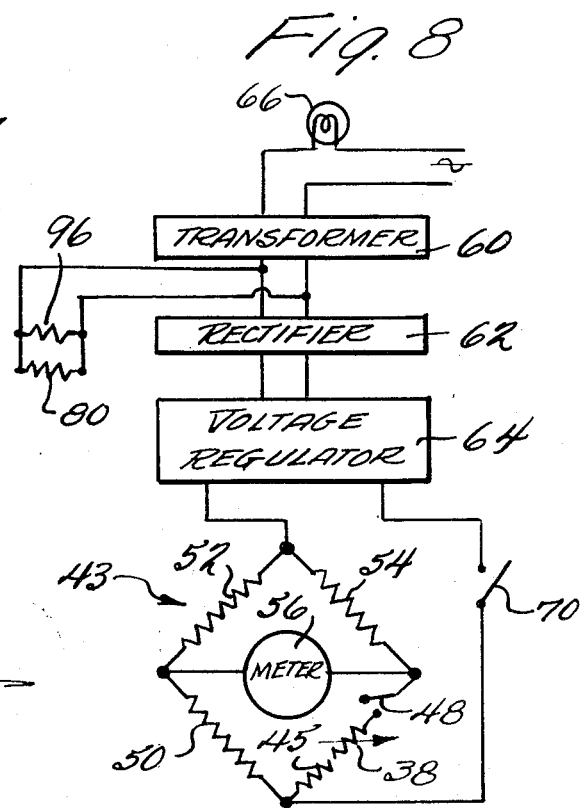
FIG. 8 shows a schematic view of the bridge and meter.

As shown in FIG. 3, thermister 38 is electrically connected to casing 26 by a pair of wires 40 and 42 which each connect to one end of thermister 38, and further connect thermistor 38 into a conventional resistance bridge 43 shown in FIG. 8. A resistance 45 is preferably mounted in the base 44 of probe 34 and is serially connected with thermistor 38 to form one of the four legs of bridge 43.

The other three legs of bridge 43 are resistances 50, 52 and 54, respectively. A conventional D.C. meter 56 is connected across the bridge, and a D.C. voltage is also conventionally connected to the bridge. This D.C. voltage is preferably derived from a conventional 110 volt, 60 cycle per second source which is coupled to bridge 43 via transformer 60, rectifier 62 and voltage regulator 64. All of these elements can be mounted within casing 26 as desired. A "ready" light 66 is connected to the A.C. source and can be easily viewed adjacent window 28 as shown in FIG. 1.

In order to minimize power consumption and maximize the lifetime of all of the components, it is desirable to disconnect bridge 43 from its power supply whenever the thermometer is not in use. Further, it is desirable to do this automatically so that the operator need not remember or bother to flick a manual switch or other control to turn the device off or on. In this embodiment, a switch 70 is mounted in well 32 so that when probe 34 is removed it automatically closes to connect the power source to bridge 43 and when probe 34 is returned to well 32 to automatically disconnect it.

As can be best seen in FIGS. 4 and 6, this switch preferably includes a contact member 72 which extends into well 32 as shown in solid line when probe 34 is absent from well 32. In this extended position member 72 is electrically connected to contact 74, thus closing the schematically represented switch 70 of FIG. 8. Member 72 is continuously urged into well 32 by the spring-like contact 76 to which it is attached. When probe 34 is reinserted into well 32, it forces member 72 back along the groove in guide 77 into the position shown in dashed lines, with member 72 separated from contact 74 and the schematically represented switch 70 open.

Thermistor 38 and resistance 45 are connected into bridge 43 via a conventional jack 48 which is schematically represented as a switch in FIG. 8 since removal of jack 48 acts to disconnect thermistor 38 and resistance 45 from bridge 43. The values of the other three resistances of bridge 43, namely resistances 50, 52 and 54 are preferably chosen such that, with thermistor 38 and resistance 45 so removed from the bridge, meter 56 displays a temperature reading, preferably the easily remembered temperature of the human body, 98.6° F., which indicates whether the bridge is properly calibrated. Thus the calibration of the thermometer can be easily and quickly checked at any time simply by removing probe 34 from well 32 so as to close switch 70, and then disconnecting thermistor 38 and resistance 45 from bridge 43 by pulling jack 48.

As discussed above, one of the aspects of this invention relates to pre-heating thermistor 38 in well 32 to a temperature in the range of the temperature to be measured so as to minimize the time required for the thermistor to reach roughly the temperature of its surroundings. When taking human temperatures either orally or rectally, it is desirable to heat the thermistor to a temperature of roughly 105°–110° F. so that, with an 8 to 12 second travel time through a room heated to the usual room temperature, the thermistor will arrive roughly at human body temperature.

In this embodiment, pre-heating is accomplished by a resistor 80 which is mounted adjacent the bottom of well 32 and connected to a source of potential as shown in FIG. 8 for resistively heating thermistor 38. As shown in FIG. 3, resistor 80 is fastened to a diaphragm 82 by a suitable clip 84 so that the generated heat is freely conducted to probe 34 and into thermistor 38.

Figure 7:
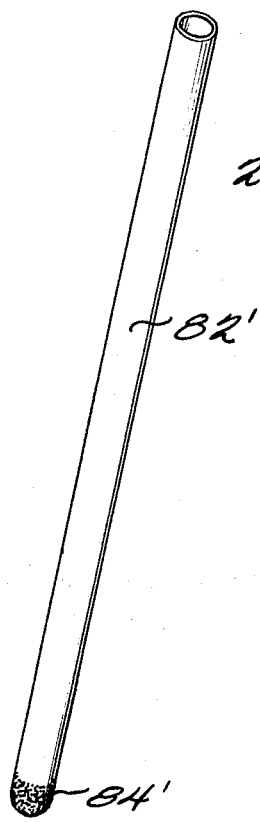
FIG. 7 shows a disposable probe cover.
Figure 2:
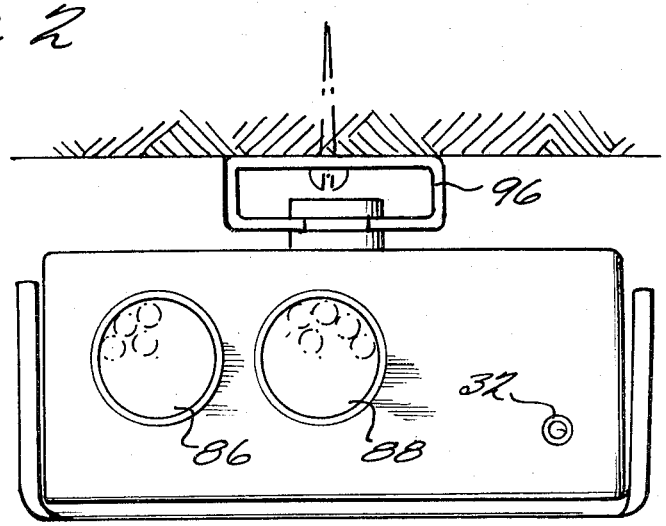
FIG. 2 shows a top view of the thermometer of FIG. 1.

One problem which can arise with the use of electronic, as well as other thermometers, is the transmission on the probe of disease bearing organisms from one patient to another. Sterilizing the probe after each use is time consuming, and if not done properly may be ineffective. One simple solution is the use of disposable probe covers which fit over the probe while in use and are replaced after each use. One such suitable probe cover 82' is shown in FIG. 7. As discussed above, cover 82' is preferably provided with a metallic tip 84' which rapidly conducts the heat surrounding it to the probe tip which carries thermister 38.

Accordingly, as shown in FIG. 1, the novel thermometer of this invention is preferably provided with two probe cover wells 86 and 88 which each can hold a plurality of such covers. One of the wells preferably holds covers for oral insertion and the other for rectal insertion. The covers in one well are preferably visually differential, e.g. by color, from the covers in the other well. Usually red covers in a well are used rectally and white covers in a white well orally. The rectal probe cover well preferably includes a talc-lubricant and the oral well a germicide. To place a cover on the probe, it is only necessary to remove probe 34 from well 32 and then to spear whichever type of cover is desired; the probe cover itself need never be touched.

As mentioned above, it is also desirable to heat the probe covers in their wells 86 and 88 to a temperature in the range of the temperature to be measured. This not only prevents rapid cooling of the heated thermistor upon insertion, but also keeps the thermistor near the desired level when it is in continuous use, without reinsertion into probe well 32.

This heating is preferably accomplished by passing current through a resistor 90 which is mounted adjacent the bottom of wells 86 and 88. Like resistor 80, resistor 90 is fastened to diaphragm 82 by a clip 92 so that the heat is freely conducted to the covers in wells 86 and 88, and is connected to the A.C. source as shown in FIG. 8. While resistor 90 heats both wells 86 and 88 in FIG. 8, it should be apparent that more resistors can be provided if desired.

Figure 5:
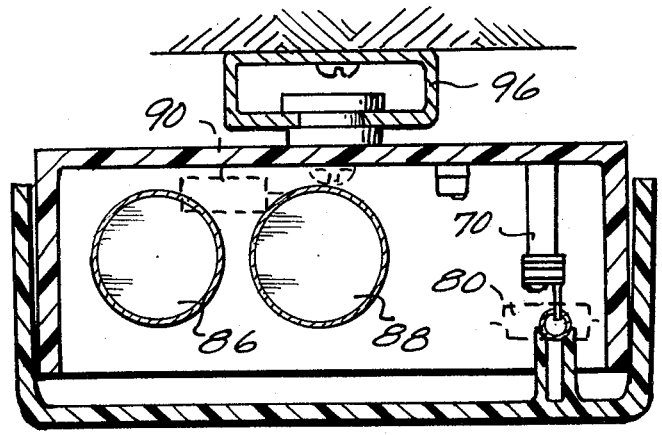
FIG. 5 shows a side cut-away view of FIG. 3 along the lines 5—5.

While the novel thermometer of this invention can be mounted in any way, it is contemplated that mounting it on a wall by a bracket 96 as shown in FIGS. 5 and 6 may be particularly desirable. In a hospital, the thermometer can be mounted between or beside hospital beds.

While it may be perfectly sanitary to use the probe 34 on one patient orally and then on the next patient rectally, it may be psychologically undesirable to do so. Accordingly, FIG. 9 shows a perspective view of another embodiment of the invention wherein two separate probes 100 and 102 are mounted in separate wells 104 and 106, with separate well switches 107 and 109. One of the probes is for oral use and the other for rectal use, and they are preferably of different colors. A manual switch 108 connects either thermister 110 of probe 104 or thermister 112 of probe 106 into bridge 114, shown in FIG. 10, which otherwise is the same as bridge 43 of FIG. 8. Resistors 120, 122 and 124 are provided for heating the two probes and the probe cover wells.

It may be desirable to provide an indication, for example, a light, when the temperature of the probe as evidenced by the bridge output has stabilized to within set limits. Many other modifications and changes in the above discussed embodiments of the invention can, of course, be made without departing from the scope of the invention and, accordingly, that scope is intended to be limited only by the scope of the appended claims.

What is claimed is:

1. A thermometer comprising:
   a casing having a probe receiving well and at least a single well for holding a plurality of disposable probe covers,
   means removably mounted in said casing having a resistance which varies with its temperature and including a probe adapted to be covered by a disposable probe cover and a thermistor mounted in said probe,
   means connected to said removably mounted means for producing a signal indicating the temperature of said removably mounted means,
   means in said casing for heating said removable mounted means while said removably mounted means is in said casing, and
   means for heating said probe covers in said probe cover well.

2. A thermometer as in claim 1 wherein said thermistor is mounted in the tip of said probe and wherein said heating means includes a resistor mounted adjacent said tip when said probe is in said well and means for supplying a current to said resistor.

3. A thermometer as in claim 2 wherein said signal producing means includes a bridge having a plurality of resistances with said thermistor being connected as one of the resistances of said bridge so that the electrical output of said bridge indicates the temperature of said thermistor.

4. A thermometer as in claim 1 including meter means connected to said bridge for displaying the temperature indicated by said electrical output of said bridge.

5. A thermometer as in claim 1 wherein said casing includes at least two probe cover wells and wherein one of said wells holds probe covers differing in visual appearance from the probe covers in the other of said probe cover wells.

6. A thermometer as in claim 1 wherein said probe cover heating means includes a resistor for heating said probe cover well and means for supplying current to said resistor.

7. A thermometer as in claim 1 wherein removably connected means includes means for supplying an electrical signal to said thermistor and including switch means in said well for disconnecting said supplying means from said thermistor when said probe is in said well and for connecting said supplying means to said thermistor when said probe has been removed from said well.

8. A thermometer as in claim 1 wherein said signal producing means includes a resistance bridge having said thermistor as one of its resistances wherein said thermistor is removable from said bridge and wherein the signal produced by said bridge when said thermistor is removed indicates a given temperature for checking the calibration of said bridge.

9. A thermometer as in claim 8 wherein said probe is adapted for insertion into a human body cavity and said given temperature is approximately 98.6° F.

10. A thermometer as in claim 1 wherein said probe is adapted for insertion into a human body cavity and wherein said heating means is adapted to heat said thermistor in said well above roughly 98.6° F.

11. A thermometer as in claim 1 wherein the interior of said casing is insulated for maintaining said interior at roughly a uniform temperature.

12. An electronic thermometer comprising:
a casing having at least a single well for holding a plurality of disposable probe covers,
probe means removably mounted in said casing including means having a physical characteristic which varies with its temperature,
means connected to said removably mounted means for producing a signal indicating the temperature of said removably mounted means, and
means in said casing for heating said probe covers in said well.

13. A method of determining the temperature at a given location with an electronic thermometer having a casing probe means adapted to be covered with a disposable probe cover and removably mounted in said casing including means having a physical characteristic which varies with its temperature comprising the steps of:
heating said temperature varying means to a temperature in excess of the temperature of said location,
heating said probe cover,
placing said heated probe cover on said probe means, and
transferring said probe means with said probe cover thereon to said location.

14. An electronic thermometer comprising:
the casing having at least a single well for holding a plurality of disposable probe covers,
probe means including having a physical characteristic which varies with its temperature,
means connected to said means for producing a signal indicating the temperature of said probe means, and
means in said casing for heating said probe cover in said well.

15. An electric thermometer as in claim 14 further including a plurality of disposable probe covers, each having a cylindrically shaped body portion and open end for receiving said probe means, and a metal tip closing the other end.

* * * * *